June 21, 1960  J. B. OTTESTAD ET AL  2,941,568
TUBE FLARING MACHINE
Filed April 21, 1958  2 Sheets-Sheet 1
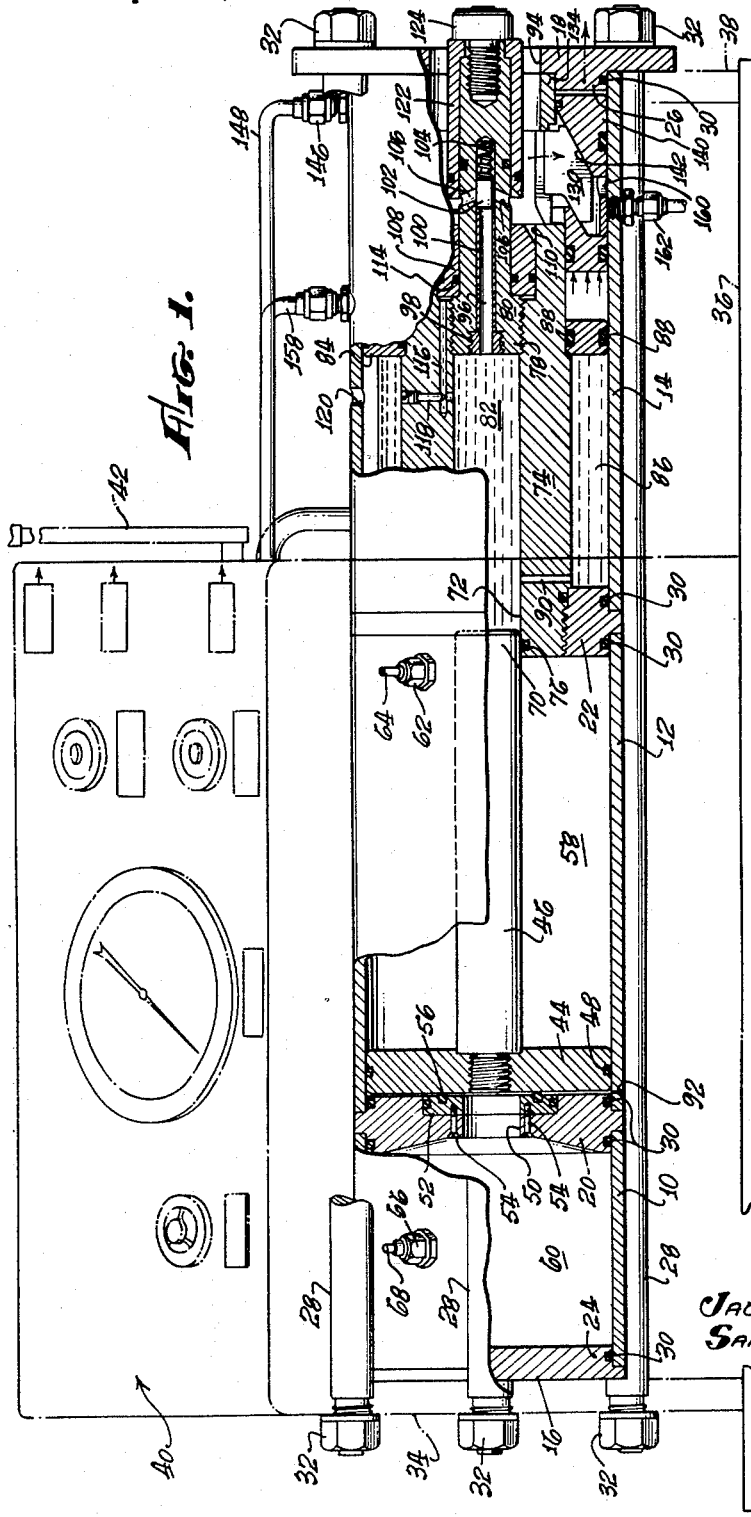
INVENTORS.
JACK BENTON OTTESTAD,
SAMUEL ARTHUR SKEEN,
By
ATTORNEY.

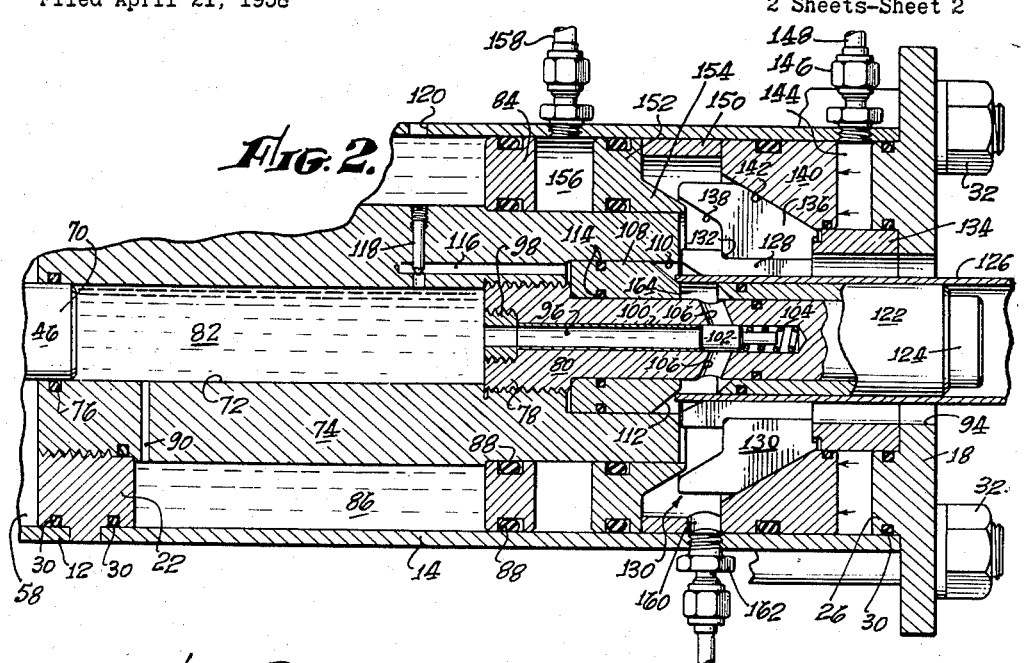
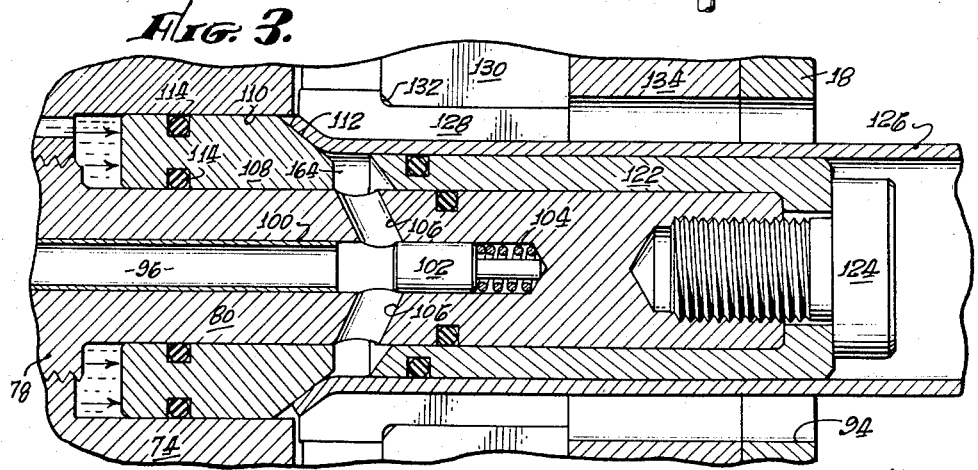
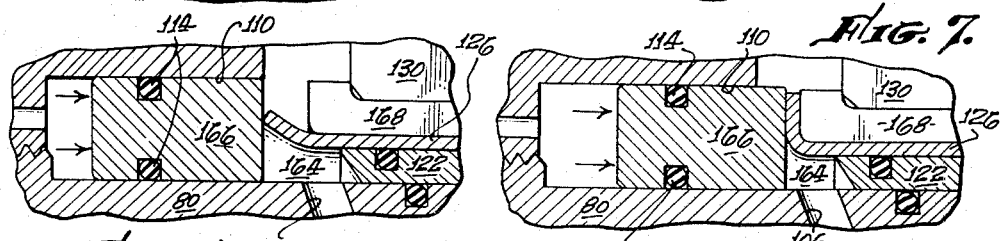

United States Patent Office 2,941,568
Patented June 21, 1960

2,941,568
TUBE FLARING MACHINE

Jack B. Ottestad, Claremont, and Samuel A. Skeen, West Covina, Calif., assignors to General Dynamics Corporation, San Diego, Calif., a corporation of Delaware Filed Apr. 21, 1958, Ser. No. 729,987

8 Claims. (Cl. 153—79)

This invention relates generally to apparatus for shaping the end portions of tubes; more particularly, it relates to apparatus which utilizes fluid pressure for such shaping.

Shaping of the end portions of tubes has conventionally been accomplished by means which involve the urging of a spinning mandrel, a spool or various types of tools against a tube end portion while the tube is clamped. This general method is characterized by certain disadvantages, including that of requiring a relatively long forming time. This has caused work hardening and stress concentrations in certain materials and has therefore resulted in tube damage during shaping operations and tube failures in service.

The present invention utilizes fluid pressure for shaping the end portions of tubes. It is capable of applying shaping pressure to a tube at a high optimum rate which substantially eliminates such problems as those resulting from work hardening and stress concentration. The shaping pressure itself operates means for retaining the shaping pressure within a tube during the shaping operation.

For rapidly producing a shaping pressure and for predetermining its rate of application to a tube, a preferred embodiment of the present invention utilizes features of the pressure generator described and claimed in the copending application of Jack Benton Ottestad and Samuel Arthur Skeen, Serial No. 709,992, filed January 20, 1958. The input pressures utilized in the pressure generator are also utilized with the present invention to actuate mechanisms for clamping a tube upon the application of the shaping pressure and for unclamping the tube upon the relieving of that pressure.

It is therefore an object of the present invention to provide a novel apparatus which utilizes fluid pressure for shaping the end portion of a tube.

An object of this invention is the provision of a novel tube shaping apparatus which is adapted for shaping material at an optimum high rate which minimizes work hardening and stress concentration.

It is an object of this invention to provide a novel device for economically and conveniently shaping the end portions of tubes.

An object of the present invention is to provide a novel tube shaping apparatus capable of flaring at an optimum rate which prevents tube damage.

It is another object of this invention to provide a novel tube shaping machine wherein a shaping pressure urges seal means against a tube to retain the shaping pressure therein during shaping.

Another object of the present invention is the provision of a novel tube shaping machine wherein pressures utilized in generating a shaping pressure are also utilized to actuate means for clamping and unclamping a tube.

Other objects and features of the present invention, as well as many advantages thereof, will become apparent to those skilled in the art from a consideration of the following description, the appended claims and the accompanying drawings, in which:

Figure 1 is an elevational view, partially in section, of a preferred embodiment of the tube shaping apparatus of the present invention mounted in operative relation with a control panel;

Figure 2 is an elevational sectional view showing a portion of the apparatus of Figure 1 on an enlarged scale;

Figure 3 is a fragmentary sectional view showing a portion of the apparatus of Figure 2 on an enlarged scale with certain elements in different operating positions;

Figure 4 is a perspective view showing a tool ring and a clamping cone utilized with the present invention;

Figure 5 is a perspective view showing the elements of Figure 4 with their respective parts radially expanded from the contracted configuration shown in Figure 4; and Figures 6 and 7 are fragmentary sectional views showing modified forms of a seal member and a tool ring utilized with the present invention in different positions during a tube flanging operation.

Referring to the drawings, and particularly to Figures 1 and 2, there is shown a preferred embodiment of the tube-flaring machine of the present invention. Cylindrical sections 10, 12 and 14, an actuator end wall 16 and an end member 18 constitute a machine housing. An orifice plate 20 is disposed between cylindrical sections 10 and 12, and an annular wall member 22 is similarly disposed between cylindrical sections 12 and 14. Peripheral flange portions of the plate and wall member abut the ends of respective cylindrical sections, as shown. Reduced portion 24 of the actuator end wall and reduced portion 26 of the end member accommodate end portions of cylindrical sections 10 and 14 respectively, as shown in Figure 1. The cylindrical sections, the actuator end wall 16, orifice plate 20, the annular wall member and the end member are secured in clamped relation by tie bolts 28, which extend through registering apertures spaced symmetrically about end member 18 and actuator end wall 16. Pressure sealing is provided between each cylindrical section and the parts adjacent thereto by annular sealing elements 30 disposed in appropriate grooves.

The tie bolts and nuts 32 secure one end of the tube-flaring machine to a mounting wall 34 which rests on a base 36. The other end of the machine is seated in an arcuate portion (not shown) of a support 38 mounted on the base. A control panel 40 (shown in phantom outline) is connected with the tube-flaring machine in conventional manner and affords convenience of operation. It is provided with appropriate couplings, indicators and controls, including a control handle 42.

The machine housing contains a pressure generator and a tube-flaring apparatus. Referring to Figure 1, the pressure generator includes an actuator piston 44 slidably positioned within cylindrical section 12 and secured to a thrust column 46 by engagement of its threaded axial opening with a reduced threaded end portion of the thrust column. Pressure sealing between the piston and the cylindrical section is provided by a seal ring 48 carried in a peripheral groove in the piston. An orifice 50 is defined in the orifice plate and an annular seal plate 52 is secured thereabout, as by screws 54, in confronting relation with the actuator piston. A circular resilient seal 56 is secured as by bonding in a circular groove in the seal plate. These elements serve purposes which are hereinafter explained.

Cylindrical section 12, annular wall member 22, and the orifice plate cooperate to define a first pressure chamber or actuator chamber 58. Cylindrical section 10, the actuator end wall and the orifice plate cooperate to define a second pressure chamber or accumulator chamber 60. An appropriate connection 62 and a fluid coupling 64 interconnect the actuator chamber with a source of pressure (not shown). A similar connection 66 and coupling 68 connect the accumulator chamber with another source of pressure (not shown).

An end portion 70 of the thrust column serves as a pump plunger within a bore 72 of a pump barrel 74. Pressure sealing between the plunger and the barrel is provided by a resilient seal ring 76. The pump barrel 74 is coaxial with cylindrical section 14 and has its end portion threadedly secured in annular wall member 22. An enlarged threaded end portion 78 of a mandrel 80 is engaged in a threaded portion of bore 72 of the pump barrel, as shown.

From the foregoing description, it will be understood that the pump barrel and end portion 78 of the mandrel define a pump chamber 82. A seal ring member 84 cooperates with the pump barrel, cylindrical section 14 and annular wall member 22 in defining a supply chamber 86, which is coaxial with the pump chamber. Seal rings 88 on the seal ring member provide pressure sealing for the chamber. A passage 90 in the pump casing interconnects the two chambers for the purpose of supplying fluid to the pump chamber.

In operation, the pressure generator is capable of very rapidly producing high pressure in the pump chamber. The method of accomplishing this through the coaction of the orifice plate 20, circular resilient seal 56 and the actuator piston 44 is discussed in the co-pending application mentioned hereinbefore. It is briefly described herein in order to relate it to the present invention. A setting pressure is introduced into the actuator chamber through fluid coupling 64 from a source of pressure (not shown). A setting force is thus produced which seats the actuator piston against circular resilient seal 56 to effect positive pressure sealing which isolates chamber 58 from chamber 60. A high actuating pressure is introduced into accumulator chamber 60 through coupling 68. This pressure acts upon the area of the piston within seal 56 and is predetermined to balance the force of the setting pressure acting upon the larger area on the opposite side of the piston. Piston 44 is thus held in equilibrium. The pressure in chamber 60 is then increased by a pressure differential sufficient to unbalance the forces on the piston and cause movement of the piston from the orifice plate. Seal 56 is thereby disengaged and the high actuating pressure is thus released substantially instantaneously upon the area of the piston outside circular seal 56. A great net force is thus suddenly exerted on the actuator piston and the thrust column. The circular seal is an important element in the extremely rapid production of this high force, because it is adapted for sudden disengagement from the orifice plate to release the actuating pressure substantially instantaneously.

The very rapidly produced high thrust is translated by plunger portion 70 of the thrust column into a rapidly generated pressure in pump chamber 82. The production of high pressure is aided by a high ratio of actuator piston area to plunger area. The thrust-time pattern produced on the thrust column is governed by selection of the actuating and setting pressures, as well as by the design of the pressure generator.

From the foregoing description, it will be understood that the pressure-time output pattern of the pressure generator may be predetermined and that the rate of application of the output pressure may therefore be controlled.

Although gas might be used in pump chamber 82, a liquid such as water is preferably utilized. The relative incompressibility of a liquid results in very rapid production and transmission of pressures. It is assumed hereinafter that water is utilized.

To prepare the pressure generator for repeat operation, actuator piston 44 must be reseated against the orifice plate to re-establish pressure sealing between the piston and the plate by means of resilient circular seal 56. On reseating the piston by reducing the pressure in chamber 60 to a value slightly below that in chamber 58, a pressure approximating the reduced pressure is trapped between the piston and the orifice plate by circular seal 56 and by seal 48. If the trapped pressure were not relieved, it would tend to oppose the force exerted by the setting pressure on the opposite side of the piston. To relieve the pressure, an opening 92 of very small diameter is provided in cylindrical section 12 adjacent to the orifice plate to provide means for automatically relieving the trapped pressure to the exterior atmosphere. The opening is sufficiently large to relieve trapped pressure but is not large enough to have a significant effect in releasing the actuating pressure which passes through the orifice to actuate the piston.

In Figure 2 the tube-flaring apparatus is shown in detail. The enlarged end portion 78 of mandrel 80 is secured in a threaded portion of bore 72 and extends axially through a circular opening 94 in end member 18. An axial opening 96 in the mandrel has an enlarged threaded end portion in which is mounted a retainer 98. The retainer secures a spacer sleeve 100 against which a shut-off pin 102 is positioned by the action of a helical spring 104. The mandrel is provided with radially extending passages 106 through which there is communication when the shut-off pin moves from its position shown in Figure 2 to the position shown in Figure 3.

An annular seal member or seal cone 108 is slidably mounted on the mandrel within an enlarged opening 110 in the end portion of the pump barrel. A frustro-conical surface 112 is provided for a purpose which will become clear from discussion hereinafter. Sealing elements 114 are provided in appropriate grooves in the seal cone to provide pressure sealing. A passage 116 in the pump barrel interconnects pump chamber 82 and the opening 110 in which the seal cone is positioned. An adjustment needle 118 is threadedly mounted in a radial opening in the pump barrel and extends into an elbow of passage 116, as shown, to provide means for selectively throttling the release of pressure against the seal cone. Access to the adjustment needle for a hand tool is provided by a port 120 in cylindrical section 14.

A tube spacer 122 fits about the mandrel and is secured thereto by a bolt 124. A sealing ring provides pressure sealing between the mandrel and the tube spacer. The tube spacer and the mandrel constitute mandrel means about which a tube 126 to be flared is positioned with its end abutting frustro-conical surface 112 of the seal cone, as shown in Figure 2. Tube spacers of various sizes are used to provide mandrel means to fit tubes of different sizes.

A tool ring 128 is disposed around the tube and a clamping cone 130 is positioned about the tool ring.

As illustrated in Figures 4 and 5, both the tool ring and the clamping cone are radially sectioned and therefore adapted for radial expansion and contraction about the tube. The clamping cone is retained against axial movement by a shoulder 132 on the tool ring and by a collar 134. A conoidal section 136 and a recessed frustro-conical wall 138 are provided for purposes which will become clear from discussion hereinafter. The collar abuts end member 18 and encircles opening 94. Disposed about the clamping cone is a closing cone ring 140, which has an inner frustro-conical surface 142 adapted for sliding engagement with conoidal section 136. The closing cone ring, cylindrical housing section 14, end member 18 and collar 134 cooperate to define a pressure chamber 144, which is interconnected by an appropriate connection 146 and coupling 148 with the source of actuating pressure hereinbefore mentioned (not shown). Pressure sealing for this chamber is effected by appropriate sealing rings disposed in grooves in the end member and in the closing cone ring.

A cylindrical spacer 150 maintains the closing cone ring in spaced relation with an opening cone ring 152, which has a conical portion 154 for sliding engagement with inner surface 142 of the clamping cone. The seal ring member 84 is positioned between cylindrical section 14 and the pump barrel, and is retained against axial movement by a shoulder on the pump casing.

The seal ring member, the opening cone ring, the pump barrel and cylindrical section 14 together define a pressure chamber 156, to which the setting pressure is continuously supplied through an appropriate coupling 158 from the source of setting pressure hereinbefore mentioned. Sealing for the chamber is provided by annular pressure seals in appropriate grooves in seal ring member 84 and in the opening cone ring.

A drain opening 160 in spacer 150 permits water to pass to a drain coupling 162, which is mounted in cylindrical section 14 adjacent to the spacer. Sufficient clearance is provided between the cylindrical section and the spacer to allow water to pass therebetween to the drain coupling when the drain opening is moved from registration with the coupling by rotation or axial movement of the spacer.

In the operation of the tube-flaring machine, the tube 126 to be flared is inserted through opening 94 in end member 18 and is positioned about the mandrel means with the tool ring 128 and the clamping cone in their radially expanded or withdrawn positions, as shown in Figures 1 and 5. The tube is moved along the tube spacer until it contacts seal cone 108. By manipulation of control handle 42, the actuating pressure is simultaneously introduced into the accumulator chamber 60 and into the pressure chamber 144 between end member 18 and the closing cone ring. The actuating pressure causes the pressure generator to function in the manner described hereinbefore to very rapidly produce a high flaring pressure in pump chamber 82. At the same time, the actuating pressure in chamber 144 urges the closing cone ring in a wedging action against the radially sectioned clamping cone. Being axially restrained between collar 134 and shoulder 132, the clamping cone 130 is radially contracted against tool ring 128, which is also radially sectioned, and clamps it against the tube, as illustrated in Figures 2 and 4. The tube is thus clamped against the tube spacer to prevent axial movement during flaring.

As the flaring pressure rises, it depresses the shut-off pin 102 against helical spring 104, as shown in Figure 3. The pressure is thereby released through passages 106 in the mandrel into a chamber 164 defined by the end portion of the tube, the mandrel, the tube spacer and the seal cone. The flaring pressure is simultaneously transmitted through passage 116 in the pump casing and urges frustro-conical surface 112 of the seal cone against the end of the tube, thereby effecting dynamic sealing.

The flaring pressure in chamber 164 flares the end portion of the tube outwardly against the contoured die portion of the tool ring, as shown in Figure 3. Under the action of the flaring pressure in passage 116, surface 112 of the seal cone maintains continuous sealing contact with the tube during flaring. Loss of pressure between the tube and the seal cone is thus substantially prevented and the flaring pressure is exerted on the tube throughout the flaring operation. The pressure is applied to the tube at a very high rate which is determined by the design of the particular pressure generator and by selection of the actuating and setting pressures.

From the foregoing description, it will be understood that the dynamic coaction effected by the present invention is such that the pressure which shapes a tube also effects dynamic sealing of the tube during shaping. It will also be understood that the actuating pressure which activates the pressure generator simultaneously operates means for clamping the tube during the shaping operation.

In flaring the end portion of a tube to an acute angle such as that illustrated in Figure 3, it is preferred that the seal cone exert only a sealing force and that it exert no substantial deforming or flaring force. A flaring force exerted by the seal cone might tend to split the tube when added to the force of the flaring pressure. The rate of release of pressure through passage 116 against the seal cone is adjustable by means of adjustment needle 118, in order to regulate the force exerted by the seal cone.

To remove the tube from the machine, control handle 42 is manipulated to relieve the actuating pressure in accumulator chamber 60 and in chamber 144. The actuator piston is moved against the orifice plate by the setting pressure, and the flaring pressure is thereby relieved. The axial force on the closing cone ring 140 and the radial clamping force on the tool ring are relieved. The constant setting pressure in chamber 156 moves the opening cone ring 152 axially so that its conical portion 154 exerts a spreading action on recessed wall 154 of the clamping cone and expands its radial sections to the configuration indicated in Figures 1 and 5. The closing cone ring is moved axially by the clamping cone to the position shown in Figure 1. The clamping force on the tube is thereby relieved and the flared tube may be withdrawn from the machine.

Upon the relieving of the flaring pressure, spring 104 causes shut-off pin 102 to close radial passages 106 in the mandrel. This minimizes the amount of water which escapes through the drain opening 160 in spacer 150 when the tube is withdrawn, since the only water which escapes is that in the chamber 164 defined by the tube, the mandrel, spacer 122 and the seal cone.

The flanging of the end portion of a tube to an angle of 90° is preferably accomplished in two stages. The tube is first flared to an angle like that shown in Figure 3 in the manner hereinbefore described.

The tube is then inserted into a modified machine which utilizes the modified seal member 166 and the modified seal ring 168 shown in Figures 6 and 7. In the flanging operation it is desirable that the seal member exert sufficient force on the tube to perform the last part of the flaring operation. The force is adjusted by means of needle 118, which regulates the release of pressure through passage 116.

It is to be understood that the present invention may be utilized for shaping tube end portions into forms other than the flared and flanged configurations herein discussed.

As discussed hereinbefore, the present invention is capable of applying shaping pressure to a tube at a high predetermined rate. Optimum pressures and rates may be selected for shaping particular materials. The high pressures obtainable with the pressure generator hereinbefore described make possible the shaping of relatively heavy tube walls, the shaping of which has heretofore been substantially impracticable. The capability of shaping material at a high optimum rate minimizes work hardening and stress concentration. Tube damage and failures during the shaping operation and in service are therefore minimized. This is of great importance with respect to materials such as stainless steel which are particularly subject to damage caused by stress concentration and work hardening.

For selecting the rate of application of shaping pressure, the adjustment means described and claimed in the copending application hereinbefore mentioned, may be utilized. By this means the rate at which pressure is applied may be varied by a convenient mechanical adjustment without altering the input pressures which operate the pressure generator.

Although specific embodiment of the present invention has been described and illustrated in detail, it is to be clearly understood that the same is by way of illustration only; it is to be understood that the invention is not limited thereto, as many variations will be readily apparent to those versed in the art and the invention is to be given its broadest possible interpretation within the terms of the appended claims.

The inventors claim:

1. An apparatus for shaping the end portion of a tube comprising means for generating a shaping pressure and an actuating pressure, mandrel means for mounting the tube, a radially sectioned tool ring having a contoured portion and adapted for radial expansion and contraction about the tube, means responsive to said actuating pressure for contracting the tool ring about the tube to secure the tube against said mandrel means, a seal member having a back surface and a front surface with a surface portion of lesser area than the area of said back surface, said surface portion confronting said end portion of the tube, means for applying the shaping pressure to said back surface to urge said surface portion against said end portion to cooperate therewith and with said mandrel means to define a pressure chamber, and means for introducing the shaping pressure into said pressure chamber, said seal member retaining the flaring pressure within said chamber while said end portion of the tube is shaped against said contoured portion by said pressure.

2. An apparatus for shaping the end portion of a tube comprising a pump chamber, plunger means slidably positioned in the pump chamber, cylinder means, an actuator piston slidably positioned in the cylinder means and connected with the plunger means, a plate confronting said actuator piston and defining an orifice, sealing means disposed between the actuator piston and the plate for effecting pressure sealing therebetween about the orifice, means for exerting a setting force urging said actuator piston toward the plate to cover the orifice and effect said pressure sealing, and means for establishing an actuating pressure to act upon a portion of the actuator piston within the sealing means to overbalance the setting force and expose an increased area of the actuator piston to the actuating pressure, whereby thrust is exerted on said plunger means to produce a shaping pressure in said pump chamber, mandrel means for mounting said tube, seal means having a back surface and a front surface with a surface portion of lesser area than the area of said back surface, means for applying the shaping pressure to said back surface to urge said surface portion against said tube end portion to cooperate therewith and with said mandrel means to define a pressure chamber, means for introducing the shaping pressure within said pressure chamber, and means responsive to said actuating pressure for clamping said tube against said mandrel means, whereby the end portion of the tube is shaped.

3. An apparatus for shaping the end portion of a tube comprising means defining an actuator chamber and a pump chamber, a plate defining an orifice at an end of said actuator chamber, an actuator piston positioned within said actuator chamber and confronting the plate, plunger means connected with said actuator piston and slidably positioned in said pump chamber, sealing means positioned between the actuator piston and the plate for effecting pressure sealing therebetween about the orifice, means for exerting a setting force urging the piston toward the plate to cover the orifice and effect said pressure sealing, and means for establishing an actuating pressure to act upon a portion of the actuator piston within said sealing means to overbalance said force and expose an increased area of the actuator piston to the actuating pressure, whereby thrust is exerted on said plunger means to produce a shaping pressure in said pump chamber, mandrel means for mounting said tube, a radially sectioned tool ring adapted for radial expansion and contraction about the tube, means responsive to said actuating pressure for contracting the tool ring about the tube to secure the tube against said mandrel means, a seal member having a back surface and a front surface with a surface portion of lesser area than the area of said back surface, said surface portion confronting said end portion of the tube, means for applying the shaping pressure to said back surface to urge said surface portion against said end portion to cooperate therewith and with said mandrel means to define a pressure chamber, and passage means interconnecting said pressure chamber with said pump chamber, whereby said tube end portion is shaped by said shaping pressure.

4. An apparatus for shaping the end portion of a tube comprising means for generating a high shaping pressure, mandrel means extending into the tube for mounting said tube, a seal member having a back surface and a front surface with a surface portion of lesser area than the area of said back surface, means for applying the shaping pressure to said back surface to urge said surface portion against an end portion of the tube to cooperate therewith and with said mandrel means to define a pressure chamber, said mandrel means having passage means interconnecting said pressure chamber and said pressure generating means, a tool ring coaxial with the mandrel means and radially sectioned for contraction against said tube, said tool ring having a contoured portion positioned about said tube end portion, and means for contracting said tool ring to secure the tube against the mandrel means, whereby said end portion of the tube is radially formed against said contoured portion of the tool ring by the shaping pressure.

5. An apparatus for shaping the end portion of a tube comprising means for generating a high shaping pressure, mandrel means for mounting the tube, a seal member having a back surface and a front surface with a surface portion of lesser area than the area of said back surface, said surface portion confronting said end portion of said tube, means for applying the shaping pressure to said back surface to urge said surface portion against the tube to cooperate therewith and with said mandrel means to define a pressure chamber, said mandrel means defining passage means interconnecting said chamber and said pressure generating means, a tool ring coaxial with the mandrel means and radially sectioned for contraction about the tube, said tool ring having a contoured portion positioned about said end portion of the tube, a clamping cone coaxial with the tool ring and radially sectioned for contraction thereabout, a closing cone ring adapted to be urged by an axial force against the clamping cone in a wedging action to contract the clamping cone about said tool ring to secure the tube against said mandrel means, and means for exerting said axial force on the closing cone ring, whereby the end portion of the tube is radially formed against said contoured portion of the tool ring by the shaping pressure.

6. An apparatus for shaping an end portion of a tube comprising a pump chamber, plunger means slidably positioned in the pump chamber, cylinder means, an actuator piston slidably positioned in the cylinder means and connected with the plunger means, a plate confronting said actuator piston and defining an orifice, sealing means disposed between the actuator piston and the plate for effecting pressure sealing therebetween about the orifice, means for exerting a setting force urging said actuator piston toward the plate to cover the orifice and effect said pressure sealing, and means for establishing an actuating pressure to act upon a portion of the actuator piston within the sealing means to overbalance the setting force and expose an increased area of the actuator piston to the actuating pressure, whereby thrust is exerted on said plunger means to produce a shaping pressure in said pump chamber, mandrel means for mounting the tube, a seal member having a back surface and a front surface with a surface portion of lesser area than the area of said back surface, said surface portion confronting said end portion of said tube, means for applying the shaping pressure to said back surface to urge said surface portion against the tube to cooperate therewith and with said mandrel means to define a pressure chamber, said mandrel means defining passage means interconnecting said pressure chamber and said pump chamber, a tool ring coaxial with the mandrel means and radially sectioned for contraction about the tube, said tool ring having a contoured portion positioned about said end portion of the tube, a clamping cone ring adapted to be urged by an axial force against the clamping cone in a wedging action to contract the clamping cone about said tool ring to secure the tube against said mandrel means, and means for exerting said axial force on the closing cone ring, whereby the end portion of the tube is radially formed against said contoured portion of the tool ring by the shaping pressure.

7. Apparatus for shaping the end portion of a tube comprising means for generating a high shaping pressure, mandrel means fitting within the tube for mounting said tube, a seal member having a back surface and a front surface with a surface portion of lesser area than the area of said back surface, said surface portion confronting said end portion of the tube, means for applying the shaping pressure to said back surface to urge said surface portion against the tube to cooperate therewith and with said mandrel means to define a pressure chamber, said mandrel means defining passage means interconnecting said chamber and said pressure generating means, a tool ring coaxial with the mandrel means and radially sectioned for contraction about the tube, a radially sectioned clamping cone coaxial with the mandrel means, said clamping cone having a conoidal section and a recessed frustro-conical wall, a slidably mounted closing cone ring adapted to engage said conoidal section to produce a wedging action on the clamping cone, means for urging the closing cone ring in said wedging action to contract said tool ring and secure the tube against the mandrel means, a slidably mounted opening cone ring having a conical portion adapted to engage said recessed wall in a spreading action to release the tube, and means for actuating the opening cone ring to effect said spreading action, whereby the end portion of the tube is radially formed against said tool ring and released thereafter.

8. An apparatus for flaring the end portion of a tube comprising means defining an actuator chamber and an accumulator chamber, a plate defining an orifice between said chambers, an actuator piston positioned in said actuator chamber and confronting the plate, sealing means positioned between the actuator piston and the plate for effecting pressure sealing therebetween about said orifice, means for establishing a setting pressure in the actuator chamber to exert a force urging the piston toward the plate to cover the orifice and effect said pressure sealing, means for establishing in the said accumulator chamber an actuating pressure to act upon a portion of said actuator piston within the sealing means to overbalance said force and expose an increased area of the actuator piston to the actuating pressure for producing a shaping pressure in said pump chamber, mandrel means for mounting the tube, a seal member having a back surface and a front surface with a surface portion of lesser area than the area of said back surface, said surface portion confronting said end portion of the tube, means for applying the shaping pressure to said back surface to urge said surface portion against the tube to cooperate therewith and with said mandrel means to define a pressure chamber, said mandrel means defining passage means interconnecting said pressure chamber and said pump chamber, a tool ring coaxial with the mandrel means and radially sectioned for contraction about the tube, a radially sectioned clamping cone coaxial with the mandrel means, said clamping cone having a conoidal section and a recessed frustro-conical wall, a slidably mounted closing cone ring adapted to engage said conoidal section to produce a wedging action on the clamping cone, means for applying said actuating pressure to the closing cone ring in said wedging action, to contract said tool ring and secure the tube against the mandrel means, a slidably mounted opening cone ring having a conical portion adapted to engage said recessed wall in a spreading action to release the tube, and means for exerting said setting pressure on the opening cone ring to effect said spreading action, whereby the end portion of the tube is radially formed against the tool ring and released thereafter.

References Cited in the file of this patent

UNITED STATES PATENTS

| | | |
|---|---|---|
| 989,805 | Reynolds | Apr. 18, 1911 |
| 1,930,745 | Fisher | Oct. 17, 1933 |
| 2,100,092 | Tear | Nov. 23, 1937 |
| 2,453,785 | Cousino | Nov. 16, 1948 |
| 2,464,510 | Hull | Mar. 15, 1949 |
| 2,667,841 | Meader | Feb. 2, 1954 |
| 2,713,314 | Leuthesser | July 19, 1955 |